United States Patent
Elliott

(10) Patent No.: US 7,920,507 B2
(45) Date of Patent: *Apr. 5, 2011

(54) TIME DIVISION MULTIPLE ACCESS FOR NETWORK NODES WITH MULTIPLE RECEIVERS

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/611,253

(22) Filed: Nov. 3, 2009

(65) Prior Publication Data

US 2010/0046484 A1    Feb. 25, 2010

Related U.S. Application Data

(63) Continuation of application No. 10/779,948, filed on Feb. 17, 2004, now Pat. No. 7,630,332.

(51) Int. Cl.
*H04B 7/212* (2006.01)
(52) U.S. Cl. ............ 370/321; 370/347; 370/337
(58) Field of Classification Search .......... 370/321, 370/347, 337
See application file for complete search history.

(56) References Cited

U.S. PATENT DOCUMENTS

| | | | |
|---|---|---|---|
| 6,104,708 A | 8/2000 | Bergamo | |
| 6,160,803 A | 12/2000 | Yuen et al. | |
| 6,532,224 B1 | 3/2003 | Dailey | |
| 6,590,889 B1 | 7/2003 | Preuss et al. | |
| 6,631,124 B1 | 10/2003 | Koorapaty et al. | |
| 6,985,724 B2 * | 1/2006 | Fredriksson et al. | 455/426.1 |
| 2001/0022791 A1 | 9/2001 | Abdesselem et al. | |
| 2002/0085520 A1 * | 7/2002 | Sydon et al. | 370/335 |
| 2002/0169008 A1 | 11/2002 | Hiben et al. | |
| 2004/0131025 A1 | 7/2004 | Dohler et al. | |
| 2005/0002416 A1 | 1/2005 | Belotserkovsky et al. | |
| 2005/0018631 A1 * | 1/2005 | Sivakumar et al. | 370/329 |

OTHER PUBLICATIONS

Shepard, Timothy Jason; "Decentralized Channel Management in Scalable multihop Spread-Spectrum Packet Radio Networks"; Jul. 1995; Laboratory for Computer Science, Massachusetts Institue of Technology; 81 pages.

* cited by examiner

*Primary Examiner* — Barry W Taylor

(57) ABSTRACT

A system facilitates communication among nodes in a wireless network. A timeslot is assigned to each of a group of nodes (201) in the wireless network (400, 800, 1200, 1300). The timeslot is a time for a corresponding node to receive messages transmitted by other nodes (201). A modulation scheme is assigned to each of the nodes (201). A message is transmitted from at least one of the nodes (201), using the assigned modulation scheme, to at least one destination node during a timeslot assigned to the at least one destination node. The messages are received at the at least one destination node from the at least one of the nodes (201).

26 Claims, 13 Drawing Sheets

TIME DIVISION MULTIPLE ACCESS FOR NETWORK NODES WITH MULTIPLE RECEIVERS

This is a continuation of prior co-pending U.S. patent application Ser. No. 10/779,948 filed on Feb. 17, 2004, titled "TIME DIVISION MULTIPLE ACCESS FOR NETWORK NODES WITH MULTIPLE RECEIVERS." The contents of this prior application are hereby incorporated by reference herein in their entirety. Benefits are claimed under 35 U.S.C. § 120.

TECHNICAL FIELD

The invention relates to the field of communications networks and, more particularly, to systems and methods for communicating among nodes in a wireless network.

BACKGROUND OF THE INVENTION

Communications networks typically include a number of interconnected communicating nodes. The connections between nodes are usually made through physical wires or optical links. Wireless networks, in which nodes connect through wireless links, are also well known.

Wireless networks generally employ radio-frequency channels to communicate between nodes. In a wireless network that uses Frequency Division Multiple Access (FDMA), channels are defined by the use of one or more radio-frequencies. For example, node A may communicate with node B on one channel using frequency 1, while node C may communicate with node D on another channel using frequency 2.

In a wireless network that employs Code Division Multiple Access (CDMA), channels are defined by a set of spreading codes (a spreading code may control, or allow variations in, transmission frequencies in accordance with prescribed mathematical function or functions). Thus, for example, node E may transmit to node F using a first spreading code and node G may transmit to node H using a second spreading code. The two transmissions may overlap in frequency and time. On reception, nodes F and H can extract the intended information using the first and second spreading codes, respectively.

In a wireless network that employs Time Division Multiple Access (TDMA) channels, one or more time slots may be assigned to each node, such that each respective node may transmit information only within its assigned time slots. FIG. 1 illustrates an exemplary wireless network 100 that employs TDMA to define multiple channels.

Wireless network 100 includes nodes 102-112. Nodes 102-112 may be included in, for example, an airplane, a ground station, a sensor, and a vehicle, such as a car or a ship. Each node may be assigned a timeslot in which to transmit. For example, node 102 is assigned timeslot 116, node 104 is assigned time slot 122, node 106 is assigned timeslot 114, node 108 is assigned timeslot 118, node 110 is assigned timeslot 120, and node 112 is assigned timeslot 124. Thus, each node may transmit to other nodes only during the node's respective assigned timeslots. A receiving node may thus receive information from another transmitting node when the transmitting node transmits during its assigned timeslot.

Typically, each node in a network has a single transceiver. Usually the single transceiver may transmit or receive, but may not simultaneously transmit and receive because the power used to transmit information may interfere with reception. Such transceivers are called half-duplex transceivers. Full-duplex transceivers are capable of simultaneous transmission and reception. This can be achieved by devoting one frequency (in an FDMA network) or one spreading code (in a CDMA network, direct sequence spread spectrum radios, or frequency hopping radios) to transmission in one channel and another frequency or spreading code to reception in another channel. Thus, a full-duplex transceiver actually transmits and receives simultaneously by using two channels.

Some nodes in wireless networks have multiple transceivers that are operated independently of other transceivers. In some relatively rare cases multiple transceivers may be used in a coordinated fashion within a given network node. For example, in one system, a node may transmit and receive distinct synchronization patterns on multiple channels in parallel using closely coordinated multiple transceivers.

Due to increasing demand for more bandwidth within communications networks, a more efficient way of transmitting and receiving information among nodes in a wireless network is desired.

SUMMARY OF THE INVENTION

Systems and methods for providing an efficient way to transmit and receive information among nodes in a wireless network are provided. Each node is assigned at least one TDMA timeslot for receiving messages. Multiple messages may be received by a node during an assigned timeslot. Each received message may be distinguished within the receiving node using different transmit spreading codes, carrier frequencies, or frequency hop sets.

In a first aspect of the invention, a method of communicating among nodes in a wireless network is provided. Using the method, a timeslot is assigned to each of a group of nodes in the wireless network. The timeslot is a time for a corresponding node to receive messages transmitted by other nodes. A modulation scheme is assigned to each of the nodes. A message is transmitted from at least one of the nodes, using the assigned modulation scheme, to at least one destination node. The message is received at the at least one destination node from the at least one of the nodes.

In a second aspect of the invention, a network is provided. The network includes a group of nodes. Each of the nodes has an assigned modulation scheme. Each of the nodes includes at least one transmitter and a group of receivers. The at least one transmitter is configured to transmit to a destination node using the assigned modulation scheme. The group of receivers is configured to receive multiple messages during a TDMA timeslot assigned to the node.

In a third aspect of the invention, a network is provided. The network includes means for transmitting in a network, that includes a group of nodes, messages using multiple modulation schemes, and means for receiving the messages only during assigned timeslots.

In a fourth aspect of the invention, a machine-readable medium having instructions recorded thereon is provided. When the instructions are read and executed by at least one processor of a node, the node is configured to: receive a message from at least one of a plurality of nodes during a receive timeslot assigned to the node.

In a fifth aspect of the invention, a method of communicating among nodes in a wireless network is provided. Using the method, a node in a network receives, during a TDMA timeslot assigned to the node for receiving, multiple messages transmitted by a group of other nodes. Each of the other nodes transmits messages to the node, using a different orthogonal or nearly orthogonal transmit spreading code, during the timeslot assigned to the node.

In a sixth aspect of the invention, a method is provided for simultaneously receiving multiple messages in a wireless network node. Using the method, a node in the network receives, during a TDMA timeslot assigned to the node, the multiple messages transmitted by a group of other nodes. Each of the other nodes transmits messages during the timeslot assigned to the node using a different carrier frequency.

In a seventh aspect of the invention, a method for communicating among a group of ultra-wideband radios functioning as wireless network nodes is provided. Using the method, one of a group of transmit spreading codes is used to transmit a message from an ultra-wideband radio to at least one other of the ultra-wideband radios in a wireless network during a timeslot assigned to the at least one other of the ultra-wideband radios for receiving the message.

In an eighth aspect of the invention, a node is provided. The node includes at least one transmitter and multiple receivers. The at least one transmitter is configured to transmit to a destination node using an assigned modulation scheme during a timeslot assigned to the destination node. The receivers are configured to receive messages during a timeslot assigned to the node.

In a ninth aspect of the invention, an ad-hoc network having a group of nodes is provided. A timeslot and a modulation scheme are assigned to each of the nodes. The timeslot is a time during which its respective node is capable of receiving a message from at least one other of the nodes. The message is transmitted from at least one other of the nodes in accordance with the modulation scheme to at least one of each of the nodes during the timeslot assigned to the at least one of each of the nodes. The at least one of each of the nodes receives the message.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Operating Environment

One type of wireless network is known as an "ad-hoc" network. In an ad-hoc network, nodes may cooperatively route traffic among themselves. Network nodes in these networks may not be permanent: they are instead based on physical proximity at any given point in time. The network may adjust dynamically to changing node conditions, which may result from node mobility or failure.

In general, some or all of the nodes in an ad-hoc network are capable of network routing functions ("routers"), while other nodes may be merely source or destinations for data traffic ("endpoints"). All nodes in the network may execute a set of algorithms and perform a set of networking protocols that enable the nodes to find each other, determine paths through the network for data traffic from source to destination (s), and detect and repair ruptures in the network as nodes move, fail, as battery power changes, and as communication path characteristics change over time.

Figure 1:
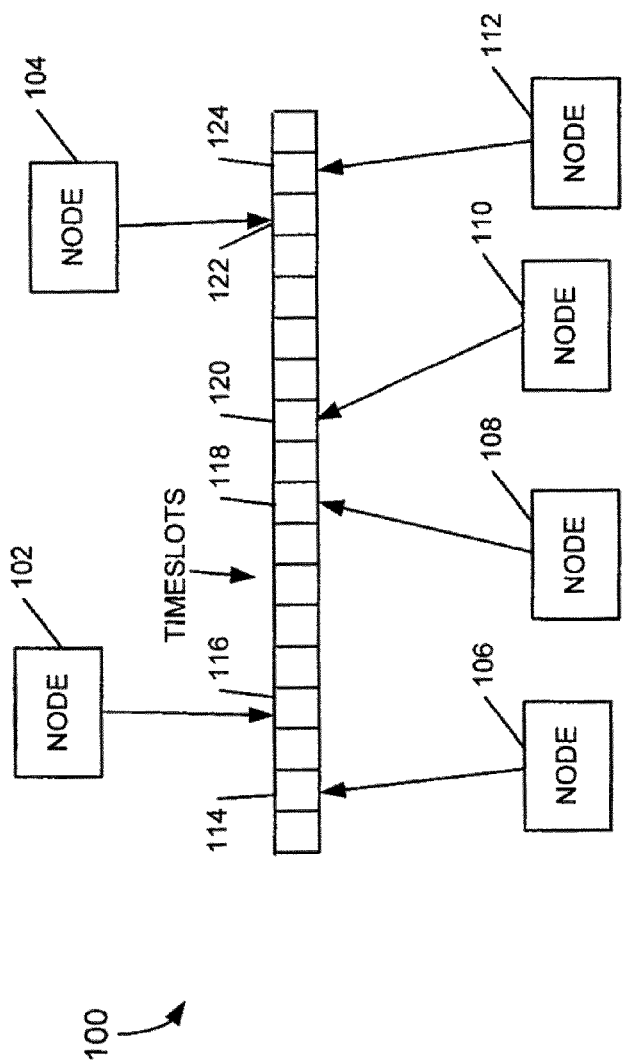
FIG. 1 illustrates an exemplary wireless network that uses an existing TDMA method for sharing a channel.
Figure 2:
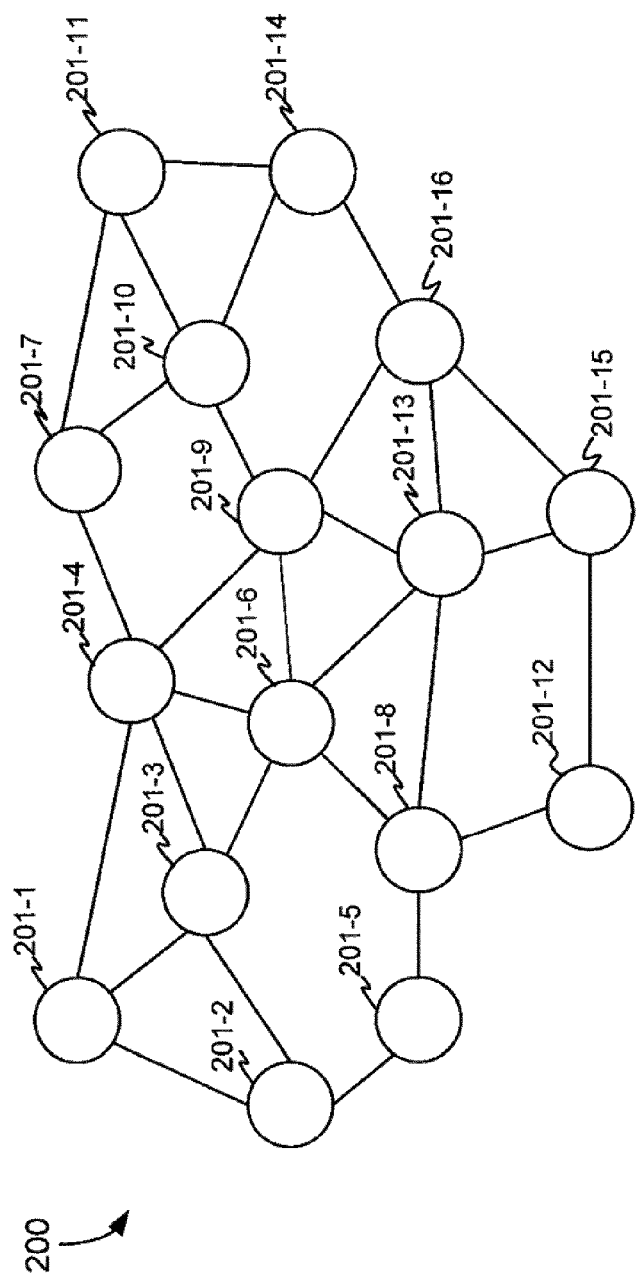
FIG. 2 illustrates an exemplary ad hoc network in which implementations consistent with principles of the invention may operate.

FIG. 2 is a diagram illustrating an exemplary ad-hoc network 200 in which implementations consistent with principles of the invention may operate. Ad-hoc network 200 includes a number of nodes 201-1 through 201-16. Lines joining nodes 201 represent connectivity; that is, if two nodes 201 are connected by a line, the two nodes can communicate directly with one another, each capable of transmitting and receiving messages. A message in network 200 can make its way through the network hop-by-hop until it reaches its destination node.

Figure 3:
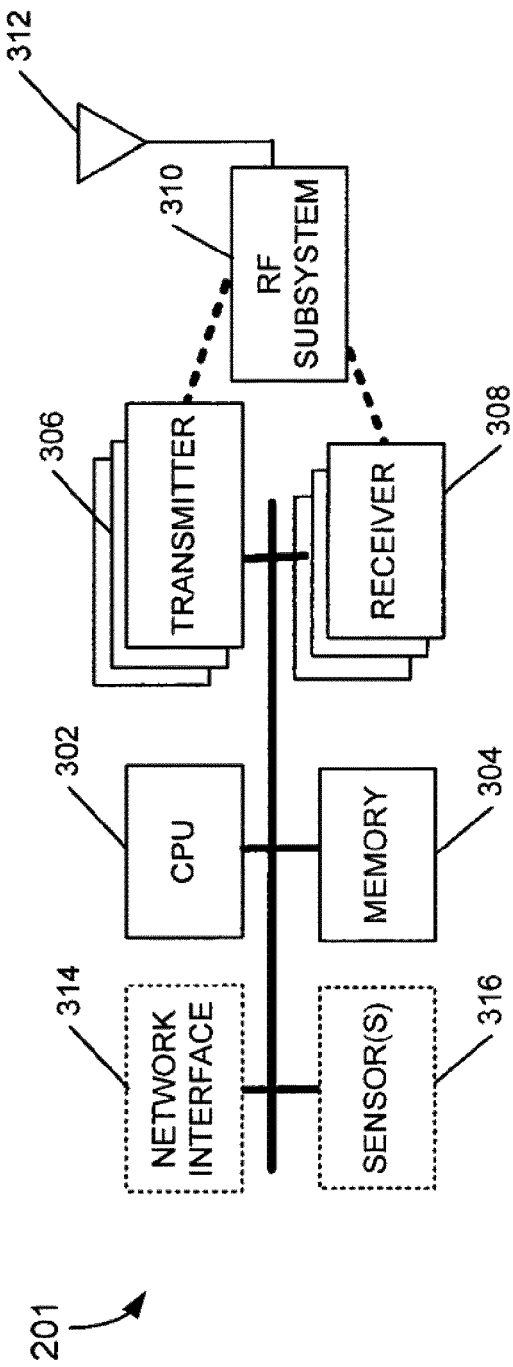
FIG. 3 is a functional block diagram that illustrates an exemplary node.

FIG. 3 illustrates exemplary node 201. Exemplary node 201 may include a Central Processing Unit (CPU) 302, memory 304, one or more transmitters 306, one or more receivers 308, RF subsystem 310 and antenna 312. Optionally, node 201 may further include network interface 314 and one or more sensors 316. The total number of transmitters 306 and receivers 308 in node 201 can be three or more. For example, node 201 may have at least one transmitter and two receivers, or node 201 may have at least one receiver and two transmitters. Further, in one implementation, transmitters 306 may be or may include transmit modems and receivers 308 may be or may include receive modems.

CPU 302 may be a conventional microcomputer, microcontroller, Digital Signal Processor (DSP), Field Programmable Gate Array (FPGA), Application Specific Integrated Circuit (ASIC) or other device capable of controlling node 201.

Memory 304 may include static memory, such as Nonvolatile Random Access Memory or flash memory for storing instructions and configuration parameters. Memory 304 may also include Dynamic Random Access Memory, or any other convenient form of memory for use as working storage during operation of node 201

Transmitters 306 may be capable of modulating messages over a wireless channel. Transmitters 306 may perform such functions as converting bits to chips, inserting preambles (for example, to provide synchronization patterns for a receive modem), adding error correction features, such as Forward Error Correction codes, and providing power level indications. In a CDMA transmitter, narrow band signals are converted to chips, or wider band signals by multiplying each complex single bit symbol by a time-varying complex spreading code sequence.

Receivers 308 may be capable of demodulating messages received by antenna 312. Receivers 308 may perform functions, such as detection of synchronization preambles, Viterbi decoding, and application of error codes.

The above described transmit and receive modems may be implemented using a mixture of hardware and software. For example, the modems may be implemented by code instantiated in Field Programmable Gate Arrays (FPGAs). Thus, by using an FPGA implementation, there would be little additional power or space requirement for installing multiple transmitters and receivers in a single node.

RF subsystem 310 may include electronics for upconverting signals from transmitters 306 for transmission via antenna 312 and for downconverting received signals from antenna 312 and passing the downconverted signals to receivers 308.

Optional network interface 314 may be a wireless or wireline interface, such as an Ethernet interface, that allows a device or another node to plug into node 201. Network interface 314 may be useful, for example, if node 201 is to act as a wired or wireless router. In this situation, RF subsystem 310 and antenna 312 may not be present.

Optional sensors 316 may be provided for sensor network nodes. Sensors 316 may include video sensors, for still or moving images, acoustic sensors, magnetic sensors, or other types of sensors. An ad hoc wireless sensor network may, for example, be used to gather environmental data for a particular area in which the nodes are placed.

Implementations

Figure 4:
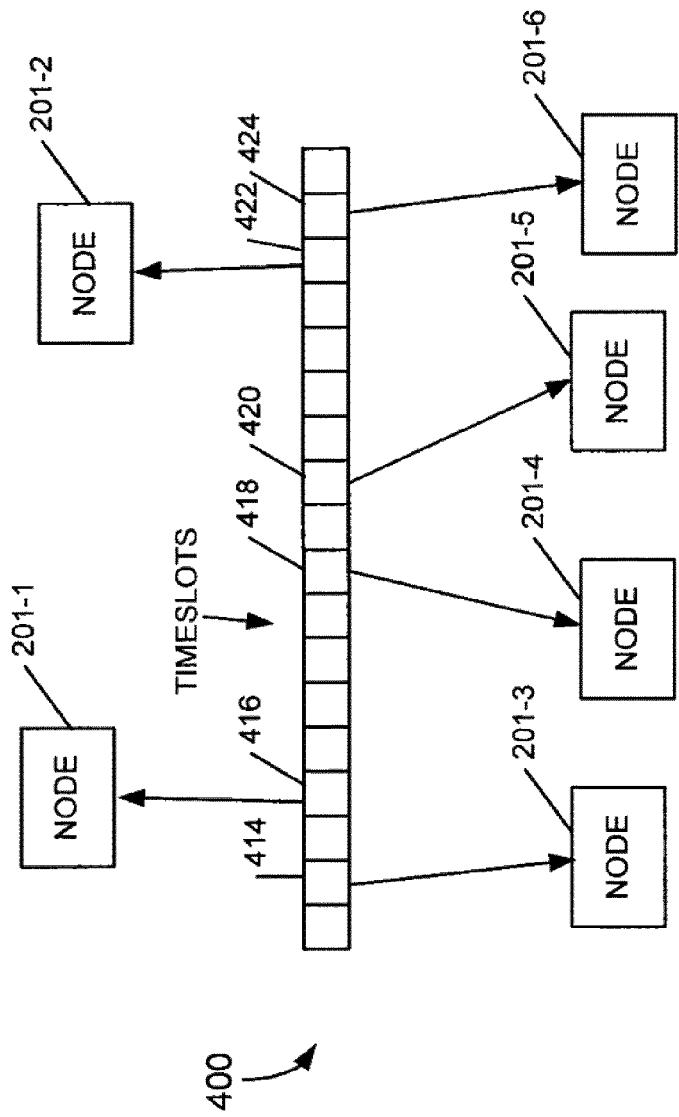
FIG. 4 shows a first exemplary wireless network consistent with the principles of the invention.

FIG. 4 illustrates an exemplary wireless network 400 consistent with the principles of the invention. Exemplary wireless network 400 includes multiple nodes 201-1 through 201-6 (each of which includes one or more receivers). Nodes 201-1 through 201-6 may operate according to a TDMA schedule that may be imposed by a predetermined configuration, by administration of a master node or by any scheme for distributing, sharing or deriving the TDMA schedule. Each of nodes 201-1 through 201-6 may be implemented in an airplane, a ground station, a sensor, or a vehicle.

In exemplary network 400, each of nodes 201-1 through 201-6 may be assigned a timeslot. Unlike traditional TDMA networks, which use timeslots for sending messages, each of nodes 201-1 through 201-6 in network 400 may use a respective TDMA timeslot for receiving messages from other nodes. Thus, in network 400, node 201-1 may use timeslot 416 to receive messages, node 201-2 may use timeslot 422 to receive messages, node 201-3 may use timeslot 414 to receive messages, node 201-4 may use timeslot 418 to receive messages, node 201-5 may use timeslot 420 to receive messages, and node 201-6 may use timeslot 424 to receive messages. In other words, instead of transmitting in an assigned timeslot and receiving in the other timeslots, nodes 201-1 through 201-6 receive in their assigned timeslots and may transmit in other timeslots.

To transmit information, each of the nodes 201-1 through 201-6 may use a different spreading code to transmit the information using CDMA techniques. The spreading codes may be orthogonal or nearly orthogonal with respect to one another (orthogonal in this context meaning that the codes are mutually non-interfering), such that multiple transmitters of nodes 201-1 through 201-6 may transmit simultaneously with the different spreading codes. In one implementation of network 400, each of nodes 201-1 through 201-6 may include a number of receivers 308 equal to a number of nodes in network 400. The multiple transmissions may then be received by receivers 308 of the node designated for that timeslot.

Figure 5:
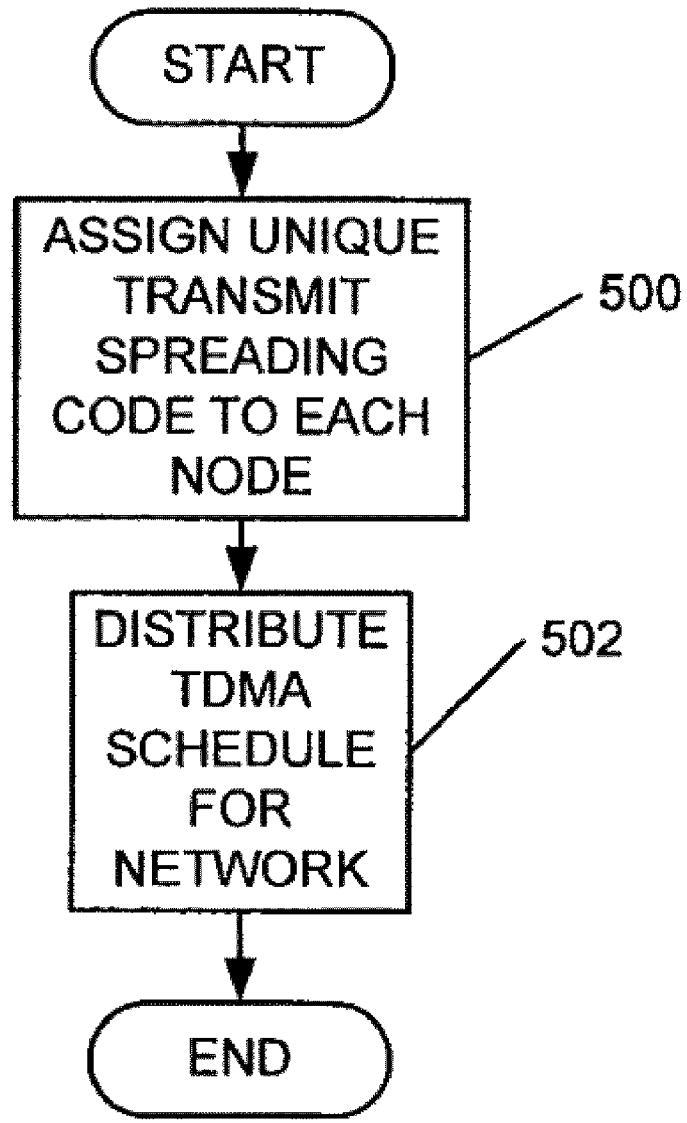
FIG. 5 is a flowchart that illustrates a networking setup process that may be used with the first exemplary wireless network.

FIG. 5 is a flowchart that illustrates an exemplary procedure that may be used for setting up a network, such as exemplary network 400. A master node, which may be one of nodes 201-1 through node 201-6, may assign a unique transmit spreading code to each node (act 500). Alternatively, the unique transmit spreading code for each node may be preconfigured in each node, such as during manufacture of the node. The master node may distribute a TDMA schedule including receive timeslots for each of the nodes (act 502). Alternatively, the TDMA schedule may be derived and/or shared among the nodes.

Figure 6:
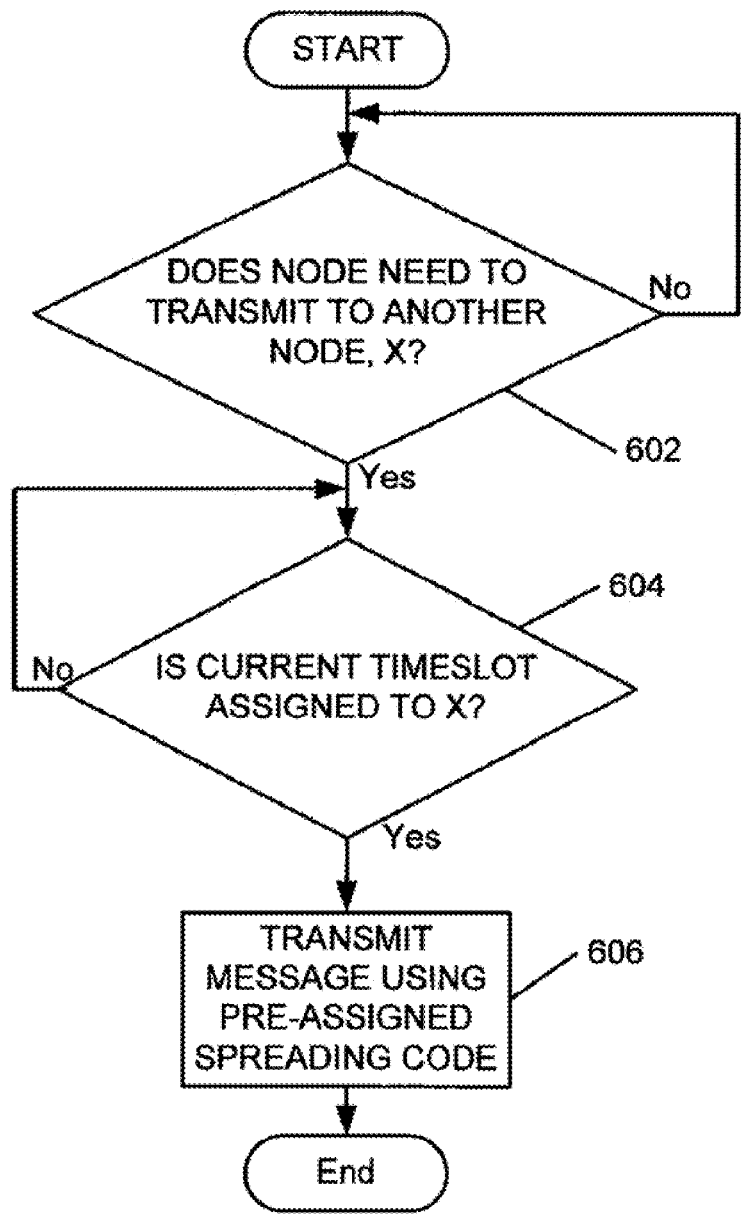
FIG. 6 is a flowchart that illustrates a process that may be used for transmitting from a node according to one implementation.

FIG. 6 illustrates exemplary procedures that may be used in nodes 201-1 through node 201-6 to transmit a message to another node. A node may determine whether it has a message to transmit to another node (act 602). If the node does not have a message to transmit to another node, the node may continue to check for a message to transmit to another node. Otherwise, the node may determine whether the current TDMA timeslot is assigned to the other node (act 604). If the current timeslot is not assigned to the other node, the node may continue to check the current time slot until the current timeslot is one that is assigned to the other node. When the node determines that the current timeslot is assigned to the other node, transmitter 306 of the node transmits the message using the transmitting node's pre-assigned transmit spreading code (act 606).

Figure 7:
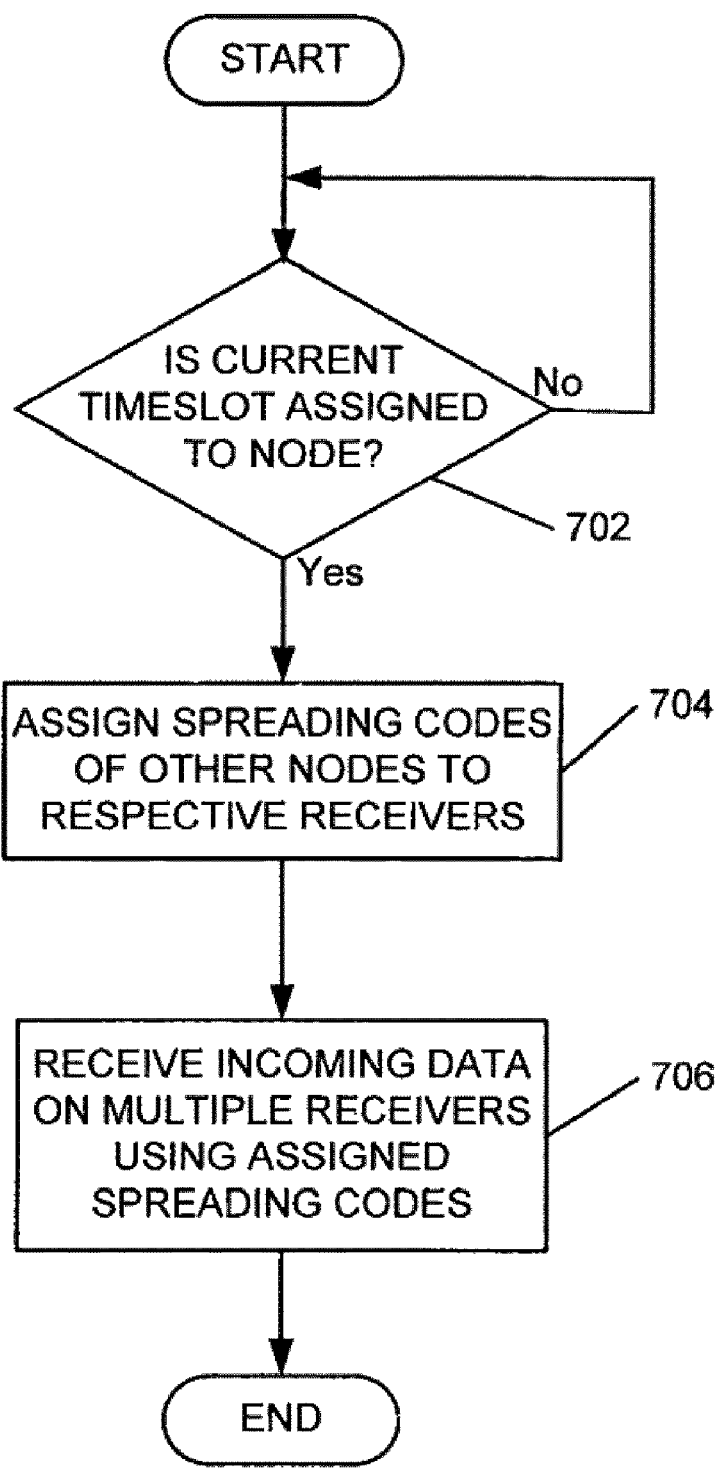
FIG. 7 is a flowchart that illustrates a process that may be used for receiving messages in a node in the first exemplary wireless network.

FIG. 7 is a flowchart that helps to explain exemplary processing that may be performed in nodes 201-1 through node 201-6 when receiving messages from other nodes in exemplary network 400. One of nodes 201-1 through node 201-6 may determine whether the current timeslot is assigned to itself (act 702). If the current timeslot is assigned to the node, the node may assign the transmit spreading codes of some or all other nodes in network 400 to respective receivers 308 (act 704). That is, each receiver 308 in the node may be assigned a different one of the transmit spreading codes. Alternatively, the node may assign the transmit spreading codes of some or all other nodes to respective receivers 308 at an earlier time. During the assigned timeslot, the node may receive multiple incoming messages on multiple receivers 308 (act 706). Each received message may be encoded with the transmit spreading code of a respective one of the transmitting nodes in exemplary network 400. Each received message may then be processed by the receiving node.

Second Implementation

A second implementation consistent with the principles of the invention differs from the previous implementation in that each node has a number, K, of receivers 308 that is less than a number of nodes in the network and K spreading codes are used in the network. Thus, the spreading codes are "overbooked" with the understanding or expectation that some nodes will not have anything to transmit during a given slot.

Figure 8:
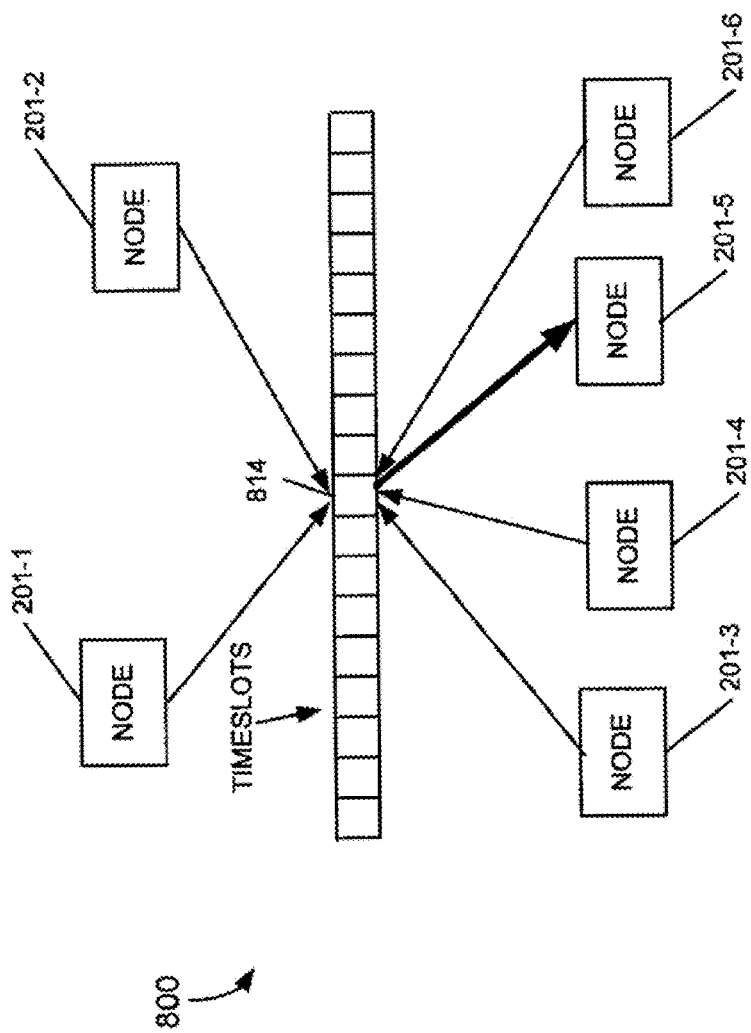
FIG. 8 shows a second exemplary wireless network consistent with the principles of the invention.

An example of the second implementation is illustrated by FIG. 8, which shows exemplary wireless network 800 consistent with another aspect of the invention. Wireless network 800 includes multiple nodes 201-1 through 201-6 (each of which may include one or more receivers, but having fewer receivers than the number of nodes in network 800). Nodes 201-1 through 201-6 may operate according to a TDMA schedule that may be pre-configured, imposed by a master node or by any scheme for distributing, sharing or deriving the TDMA schedule. Nodes 201-1 through 201-6 may be included in airplanes, ground stations, sensors, and vehicles.

In network 800, each of nodes 201-1 through 201-6 may be assigned a timeslot for receiving messages in a manner similar to that discussed with regard to network 400. Transmitters 306 may be provided with spreading codes for a direct sequence CDMA system. K spreading codes may be used within network 800, where K is less than the number of nodes in network 800. Each node 201-1 through 201-6 may have K receivers 308. The spreading codes may be orthogonal or nearly orthogonal with respect to one another, such that multiple transmitters 306 may transmit simultaneously with different spreading codes, and the multiple transmissions may be correctly received by receivers 308 in a single node during the node's assigned timeslot.

In network 800, node 201-5 may be assigned to receive during timeslot 814. Nodes 201-1 through 201-4 and 201-6 may transmit to node 201-5 during timeslot 814. Each of nodes 201-1 through 201-4 and 201-6 may transmit using a respective one of K spreading codes.

Figure 9:
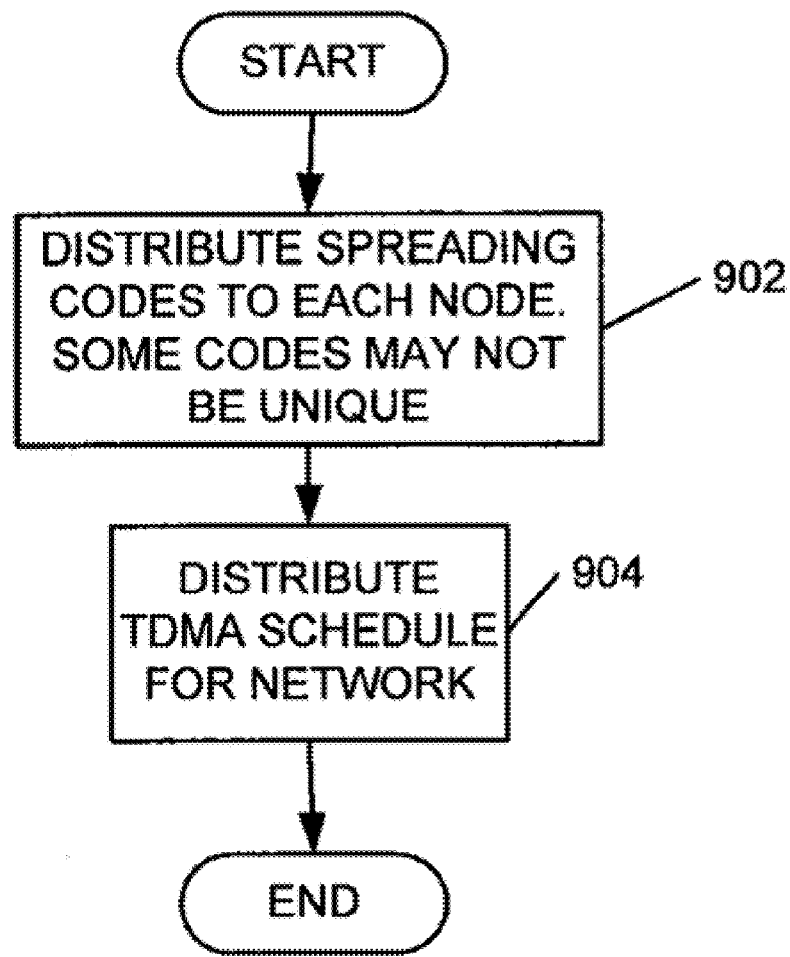
FIG. 9 is a flowchart that illustrates a networking setup process that may be used according to another implementation.

FIG. 9 is a flowchart that helps to explain an exemplary process that may occur during network setup of exemplary network 800. A master node, which may be one of nodes 201-1 through 201-6, or some other network device may distribute K orthogonal spreading codes to each of nodes 201-1 through 201-6 (act 902). As mentioned previously, K can be less than the number of nodes in network 800. Alternatively, the spreading codes may be pre-configured in nodes 201-1 through 201-6. The master node or some other network device may distribute the TDMA schedule to nodes 201-1 through 201-6 (act 904). Alternatively, the nodes may derive and/or share the TDMA schedule.

Figure 10:
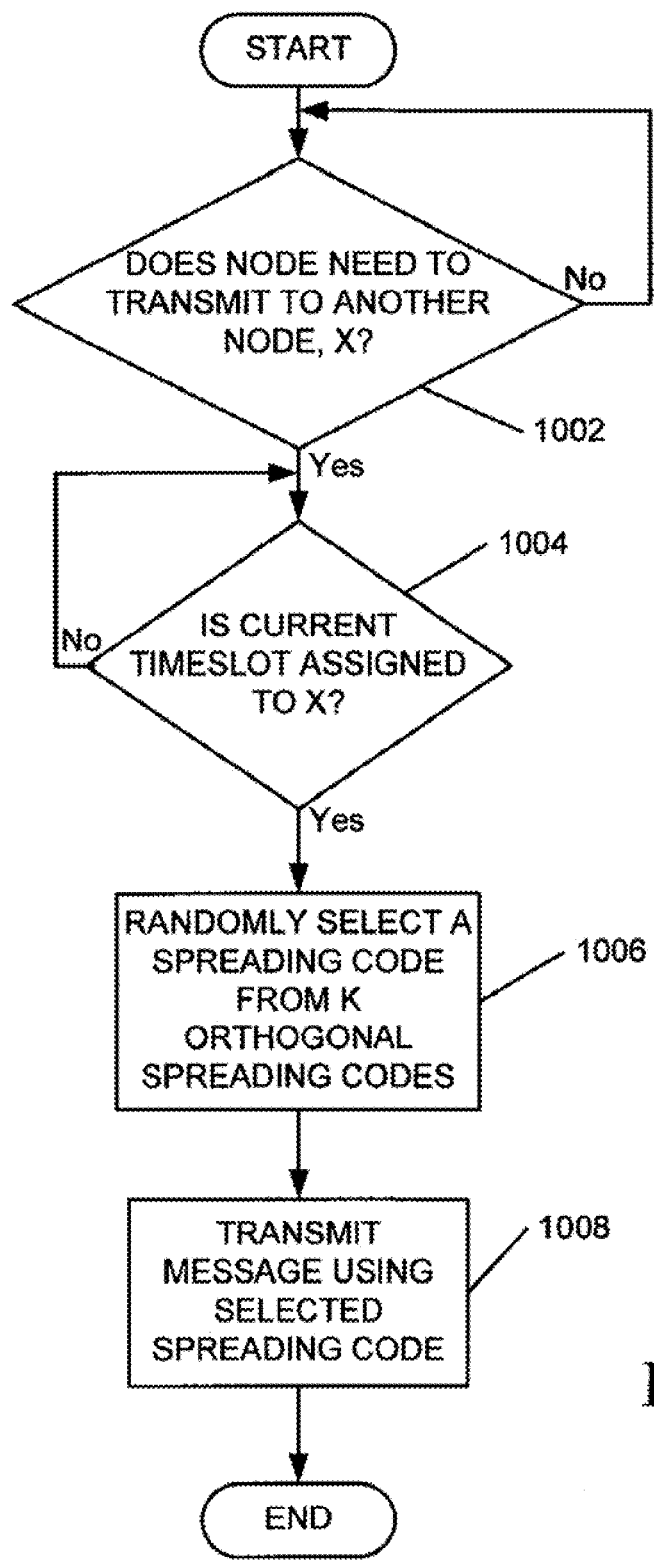
FIG. 10 is a flowchart that illustrates a process that may be used for transmitting from a node according to another implementation.

FIG. 10 is a flowchart that illustrates an exemplary procedure for nodes 201-1 through 201-6 to transmit messages to other nodes. One of nodes 201-1 through 201-6 may determine whether there is a message to transmit to another node ("X") in network 800 (act 1002). If the node determines that it has a message to transmit to another node, the node may determine whether a current timeslot is assigned to the other node (act 1004). If the current time slot is assigned to the other node, then the node may randomly select one of the K orthogonal spreading codes (act 1006) and may transmit the message to the other node using the selected spreading code to encode the message (act 1008).

Note that if two or more transmitting nodes use the same spreading code, the message may not be received correctly. Therefore, in cases where the message must be sent reliably, the transmitting node may wait to receive an acknowledgement of correct receipt from the receiving node. If no such acknowledgement is received within a predetermined time period, the transmitting node may randomly select another one of the K spreading codes and retransmit the message during a later timeslot of the receiving node.

Figure 11:
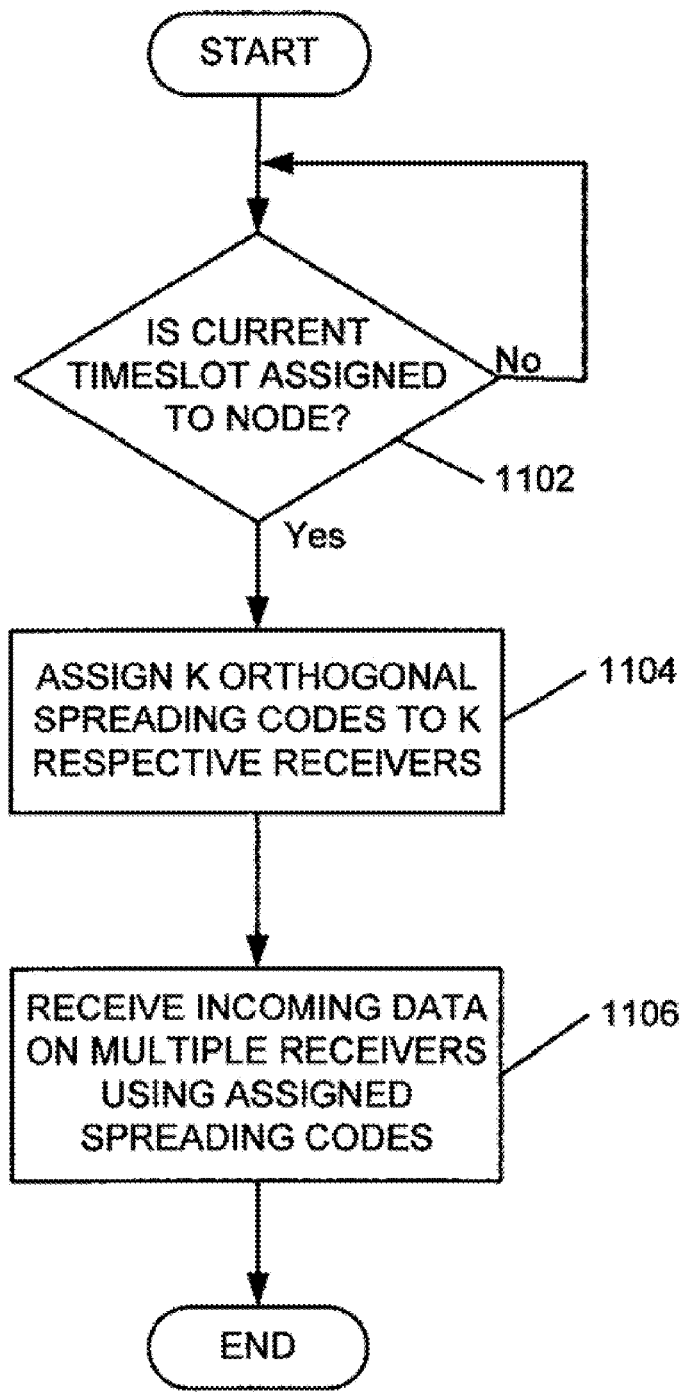
FIG. 11 is a flowchart that illustrates a process that may be used for receiving messages in a node according to another implementation.

FIG. 11 is a flowchart that explains an exemplary process in nodes 201-1 through 201-6 of network 800 for receiving a message from another node. One of nodes 201-1 through 201-6 may determine whether a current timeslot is assigned to itself (act 1102). If the current timeslot is assigned to the node, then the node assigns the K orthogonal spreading codes to its K respective receivers 308 (act 1104). That is, each receiver 308 in the node may be assigned a different one of the transmit spreading codes. Alternatively, the node may assign the transmit spreading codes to respective receivers 308 at an earlier time. The node may then receive incoming messages on multiple receivers 308 using the assigned spreading codes to demodulate the messages (act 1106).

Third Implementation

A third implementation consistent with the principles of the invention differs from the first and second implementations in that multiple nodes may be configured to receive during the same timeslots.

Figure 12:
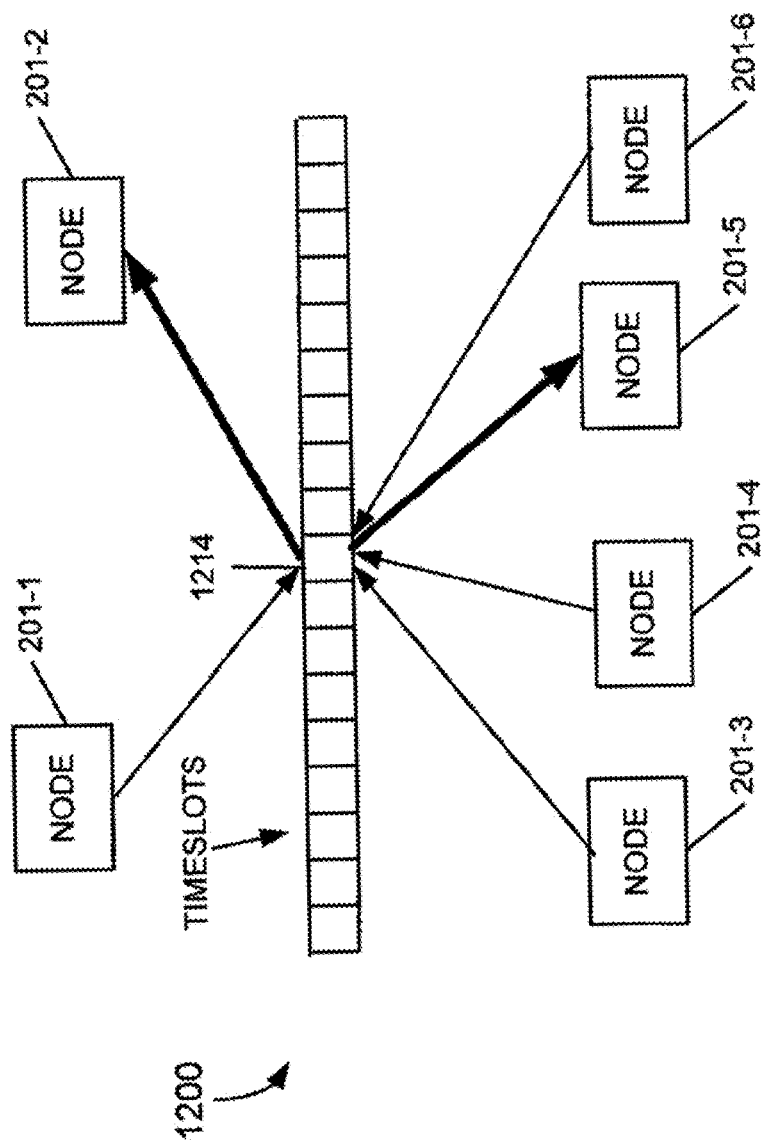
FIG. 12 shows a third exemplary wireless network consistent with the principles of the invention.

An example of the third implementation is shown in FIG. 12, which illustrates an exemplary wireless network 1200 consistent with another aspect of the invention. Wireless network 1200 includes multiple nodes 201-1 through 201-6 (each of which includes more than one receiver 308). In some implementations, the number of receivers 308 per node, K, may be less than or equal to the number of nodes in network 1200. In other implementations, the number of receivers 308 per node, K, may be greater than the number of nodes in network 1200. Nodes 201-1 through 201-6 may operate according to a TDMA schedule that may be imposed by pre-configuration of nodes 201-1 through 201-6, imposed by a master node, which may be one of nodes 201-1 through 201-6, or by any scheme for distributing, sharing or deriving the TDMA schedule. Any of nodes 201-1 through 201-6 may located in airplanes, ground stations, sensors, and vehicles. In network 1200, each of nodes 201-1 through 201-6 may be assigned a timeslot for receiving messages. In this implementation, multiple nodes may be assigned to receive information in a single timeslot.

Transmitters 306 may be provided with a spreading code for a direct sequence CDMA system. K spreading codes may be used within network 1200. In implementations in which K is less than or equal to the number of nodes in network 1200, some nodes may use the same spreading code. In implementations in which K is greater than the number of nodes in network 1200, some or all of the nodes may use a unique transmit spreading code.

Each node 201-1 through 201-6 may have K receivers 308. The spreading codes may be orthogonal or nearly orthogonal with respect to one another, such that multiple transmitters of different nodes may transmit simultaneously with different spreading codes, and the multiple transmissions may be correctly received by receivers 308 in a single node during the node's assigned timeslot.

In network 1200, nodes 201-2 and 201-5 may be assigned timeslot 1214. Nodes 201-1 through 201-6 may transmit to nodes 201-2 and 201-5 during timeslot 1214, (although node 201-2 is shown in FIG. 12 as receiving and not shown as sending, it has capacity to concurrently transmit to node 201-5 in this timeslot; likewise, although node 201-5 is shown in FIG. 12 as receiving and not shown as sending, it has capacity to concurrently transmit to node 201-2 in this timeslot). Thus, in this example, multiple nodes are transmitting to other multiple nodes during the same timeslot. Each of nodes 201-1 through 201-6 may transmit using one of K spreading codes. In some implementations, a node ID may be included in the transmitted message to indicate the intended destination (e.g., node 201-2 or 201-5). Nodes receiving the message that do not correspond to the node ID in the message may discard the received message.

Multiple nodes in network 1200 may transmit simultaneously using the same spreading code. In this situation, the receiving nodes may transmit acknowledgements to the sending node to indicate correct reception of a transmitted message. If the acknowledgment is not received within a predetermined time period, the transmitting node may retransmit the message.

FIGS. 9-11, which describe exemplary network setup and exemplary transmit and receive processing of a node in network 800 may also apply to setup of network 1200 and transmit and receive processing of a node in network 1200. FIG. 9 explains processing for network setup. FIG. 10 explains processing for transmission from a node. FIG. 11 explains processing for receiving a message in a node.

Fourth Implementation

A fourth implementation consistent with the principles of the invention differs from the previous implementations in that each node has more than one transmitter 306 as well as more than one receiver 308.

Figure 13:
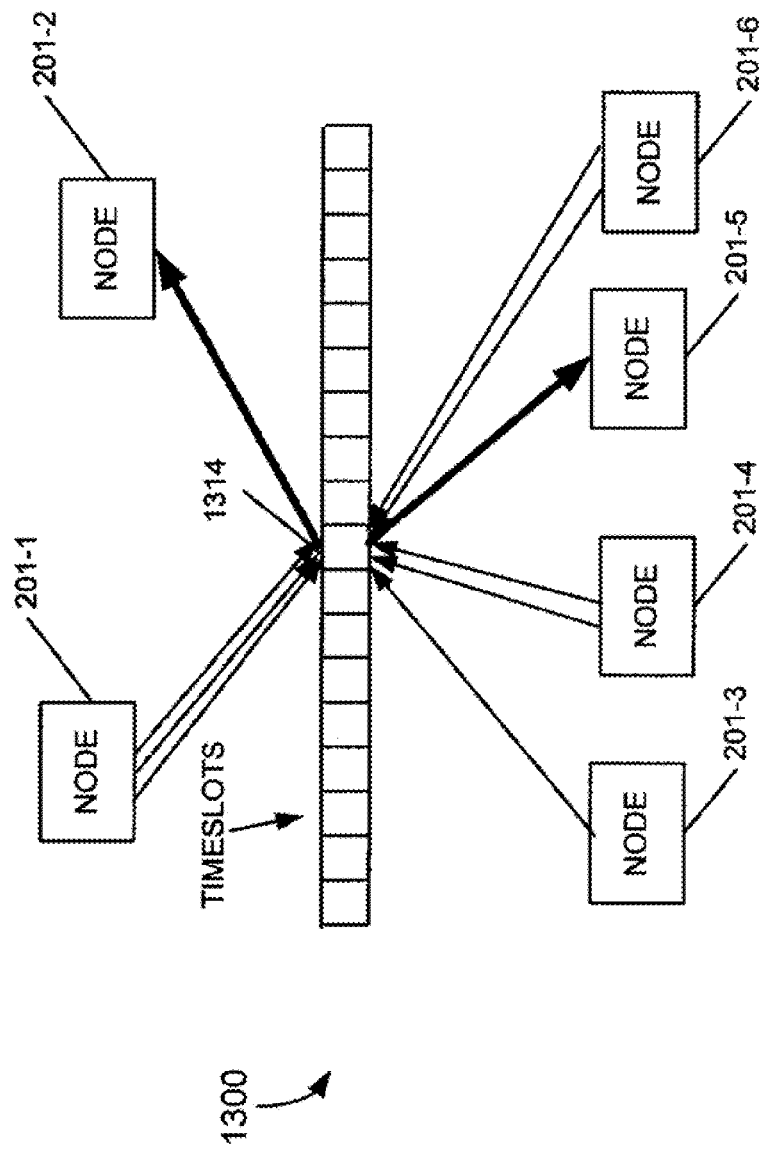
FIG. 13 shows a fourth exemplary wireless network consistent with the principles of the invention.

An example of the fourth implementation is shown in FIG. 13, which illustrates an exemplary wireless network 1300 consistent with another aspect of the invention. Wireless network 1300 includes multiple nodes 201-1 through 201-6 (each of which may include more than one receiver 308 and more than one transmitter 306). Nodes 201-1 through 201-6 may operate according to a TDMA schedule that may be pre-configured in nodes 201-1 through 201-6, imposed by a master node, which may be one of nodes 201-1 through 201-6, or by any scheme for distributing, sharing or deriving the TDMA schedule. Any of nodes 201-1 through 201-6 may be included in airplanes, ground stations, sensors, or vehicles.

In network 1300, each of nodes 201-1 through 201-6 may be assigned a timeslot for receiving messages. Multiple nodes may be assigned to receive in a single timeslot.

Each transmitter 306 may be provided with a spreading code for a direct sequence CDMA system. K spreading codes may be used within network 1300. In some implementations, K may be less than or equal to the number of nodes in network 1300. In such implementations, some nodes may transmit using the same spreading code. In other implementations, K may be greater than the number of nodes in network 1300. In such implementations, some or all nodes may transmit using a unique spreading code. The spreading codes may be orthogonal or nearly orthogonal with respect to one another, such that multiple transmitters 306 may transmit simultaneously with different spreading codes, and the multiple transmissions may be correctly received by receivers 308 in a single node during the node's assigned timeslot.

In network 1300, nodes 201-2 and 201-5 may be assigned timeslot 1314 to receive information. Nodes 201-1 through 201-6 may transmit to nodes 201-2 and 201-5 during timeslot 1314, (although not shown in FIG. 13, receiving node 201-2 may be concurrently transmitting to node 201-5 while receiving and node 201-5 may be concurrently transmitting to node 201-2 while receiving). Each of the transmitters 306 of nodes 201-1 through 201-6 may transmit using one of K spreading codes. All transmitters 306 of a node may use a different spreading code. In some implementations, a node ID may be included in the transmitted message to indicate an intended destination. Nodes receiving the message that do not correspond to the node ID in the message may discard the received message.

Some transmitters 306 within different nodes may transmit using the same spreading code. Therefore, it is possible that a transmission may not be reliably received when two or more transmitters transmit simultaneously using the same spreading code. In such an situation, the receiving node may transmit an acknowledgement to the sending node to indicate correct reception of a transmitted message. The transmitting node may wait a predetermined period of time for the acknowledgement. If the acknowledgement is not received during the predetermined time period, the transmitting node may retransmit the message during a later timeslot.

In network 1300, nodes 201-1, 201-3 through 201-4 and 201-6 may transmit, using multiple transmitters per node, during timeslot 1314 and nodes 201-2 and 201-5 may simultaneously receive the transmitted messages. Thus, for example, nodes 201-2 and 201-5 may simultaneously receive three messages from node 201-1, one message from node 201-3, two messages from node 201-4, and two messages from node 201-6.

FIG. 9, showing exemplary network setup processing, may also apply to network 1300. The received K spreading codes may be assigned by each node to each transmitter 306 within the respective node, such that no two transmitters 306 within a node are assigned the same spreading code.

The process described in either FIG. 6 or FIG. 10 for transmitting a message to another node may also apply to nodes of network 1300, such that transmitters 306 of nodes 201-1 through 201-6 may transmit a message to another node according to the process of FIG. 6 or FIG. 10. Thus, each transmitter 306 of one of the nodes may transmit messages using its respective assigned spreading code. Further, when using the process of FIG. 10 to transmit messages from nodes of network 1300, after randomly selecting a spreading code (act 1006), the node may check whether the spreading code is already assigned to another transmitter 306 within the node, and if so, another spreading code may be selected.

The process described in FIG. 11 may be used by each receiver 308 within a node in network 1300 to receive messages.

In some implementations, the spreading code of a transmitter may be changed. The spreading codes of transmitters 306 within a single node should be unique within the node because simultaneous transmissions of transmitters using the same spreading code may cause the transmissions to be garbled. Thus, when changing the spreading code of one transmitter within a node, the new spreading code should not be a spreading code used by any other transmitter within the node.

It should be clear from the several examples and discussion given above that each node may be assigned to more than one timeslot and during each of those separate timeslots a particular node can receive messages from one or more other nodes. It also should be clear from the several examples and discussion above that each timeslot may be assigned to more than one node, whereby multiple nodes to which a particular timeslot is assigned can receive messages from one or more other nodes during that particular timeslot.

Channels

The above implementations use spreading codes in a spread spectrum system. However, other implementations are possible. For example, spreading codes may be used for transmitting messages from Ultra-Wideband (UWB) radio nodes. UWB radios convey information by transmitting a number of very precisely timed, very short bursts of RF noise. The bursts correspond to "chips" in conventional direct sequence spread spectrum techniques. Thus, a network of UWB radios may transmit a carefully spaced series of pulses to represent a 0 or 1. A number of such sequences may be used as different spreading codes. Thus, an implementation may include a number of UWB radios having one or more transmitters and receivers, wherein each UWB radio is assigned a respective TDMA timeslot for receiving messages.

Shared channels may be implemented using other modulation schemes instead of spreading codes. For example, a node may tune each of its receivers to a different carrier frequency. Thus, a node may simultaneously receive messages transmitted on different frequencies. Shared channels may also be implemented via a frequency hopping (FH) spread spectrum modulation scheme. In such a network, each receiver would be given its own hop set, instead of a spreading code.

Although the above exemplary networks were described as using RF channels, implementations are not limited to using RF channels. The techniques described above may be applied to a wide range of transmission media, including optical, acoustical, and magnetic media. Further, each of the nodes depicted in FIGS. 4, 8, 12 and 13 may be implemented within a commercial, military, or other usage environment.

Modifications and Variations

Embodiments of the invention may be implemented in hardware, software, or firmware. The firmware may be in Read-Only Memory (ROM) and the software may reside on, for example, a medium, such as floppy disk, optical disk, or CD ROM.

Conclusion

The foregoing description of preferred embodiments of the invention provides illustration and description, but is not intended to be exhaustive or to limit the invention to the precise form disclosed. Modifications and variations are possible in light of the above teachings or may be acquired from practice of the invention for example, while a series of acts has been described with regard to FIGS. 5-7 and 9-11, the order of the acts may differ in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method, comprising:
   assigning a timeslot to each of a plurality of nodes in a wireless network, the timeslot being a time for a corresponding one of the plurality of nodes to receive messages transmitted by other of the plurality of nodes, and not assigning, to said each of said plurality of nodes, a timeslot for transmitting;
   assigning a modulation scheme to each of the plurality of nodes;
   transmitting a message from at least one of the other of the plurality of nodes, using the assigned modulation scheme, to at least one destination node within the plurality of nodes, the message being transmitted during a timeslot assigned to the at least one destination node; and
   receiving, at the at least one destination node, a message from the at least one of the other of the plurality of nodes.

2. The method of claim 1, wherein the assigning comprises assigning one of a plurality of transmit spreading codes to each of the plurality of nodes.

3. The method of claim 1, wherein the assigning comprises assigning one of a plurality of hop sets to each of the plurality of nodes.

4. The method of claim 1, wherein:
   the assigning comprises assigning a unique transmit spreading code to each of the plurality of nodes.

5. The method of claim 1, wherein:
   the transmitting a message comprises transmitting messages from a plurality of transmitting nodes, and
   the receiving a message comprises receiving, at one of the at least one destination node, the respective messages from the plurality of transmitting nodes.

6. The method of claim 1, wherein the receiving a message comprises receiving, at a plurality of the at least one destination node, messages from a plurality of transmitting nodes.

7. The method of claim 1, wherein the assigning comprises assigning one of a plurality of orthogonal or nearly orthogonal transmit spreading codes to each of the plurality of nodes.

8. The method of claim 7, wherein the assigning further comprises assigning one of K orthogonal or nearly orthogonal transmit spreading codes to each node, where K is a number less than a number of nodes in the wireless network.

9. The method of claim 7, further comprising:
   waiting, after the transmitting, for an acknowledgement indicating correct receipt; and
   when the acknowledgement is not received after a predetermined period of time:
   selecting a new transmit spreading code; and
   retransmitting the message.

10. The method of claim 1, wherein:
    the assigning comprises assigning a plurality of one of orthogonal or nearly orthogonal transmit spreading codes, carrier frequencies, and hop sets to each node of the plurality of nodes, each of the nodes having a plurality of transmitters and a plurality of receivers,
    the transmitting comprises transmitting a plurality of messages from one of the nodes to the at least one other of the nodes, and
    the receiving comprises receiving, from the one of the nodes, the plurality of messages.

11. The method of claim 1, wherein the timeslot is the same for the each of the plurality of nodes.

12. The method of claim 1, wherein the timeslot is different for the each of the plurality of nodes.

13. The method of claim 1 wherein the timeslot is the same for certain of the plurality of nodes and is different for each of the plurality of nodes other than the certain nodes.

14. A network comprising:
    a plurality of nodes, each said node having an assigned timeslot during which messages are received from other nodes in said, plurality, not having an assigned timeslot during which messages are transmitted, and having an assigned modulation scheme, wherein said each said node comprises:
    at least one transmitter configured to transmit to a destination node using the assigned modulation scheme during a receiving timeslot assigned to the destination node; and
    a plurality of receivers configured to receive a plurality of messages during a receiving timeslot assigned to said each said node.

15. The network of claim 14, wherein each of the nodes further comprises:
a plurality of transmitters, each of the transmitters being configured to transmit using one of a plurality of transmit spreading codes, a plurality of carrier frequencies, and a plurality of hop sets.

16. The network of claim 14, wherein each one of the receivers is configured to demodulate each of the received messages using one of a transmit spreading code of the plurality of transmit spreading codes, a carrier frequency of the plurality of carrier frequencies, and a hop set of the plurality of hop sets.

17. A network comprising:
means for transmitting messages from any or all of a plurality of nodes included in said network, said transmitting means using a plurality of modulation schemes; and
means for receiving in one of said nodes any of said messages transmitted from other than said one node to said one node during a receiving timeslot assigned to said one node;
wherein each of said plurality of nodes is assigned a timeslot for receiving said messages and not assigned a timeslot for transmitting said messages.

18. A machine-readable medium having recorded thereon instructions for at least one processor of a node connected in a network of nodes, such that when the at least one processor reads and executes the instructions, the node is configured to:
receive, a message from at least one of the other nodes during a receive timeslot assigned to the node;
wherein each node in said network of nodes is assigned a timeslot for receiving messages transmitted to said each node and is not assigned a timeslot for transmitting messages.

19. A method comprising:
receiving, by a node in a network during a TDMA timeslot assigned to the node for receiving, a plurality of messages transmitted by a plurality of other-nodes in the network, each of the other-nodes transmitting messages to the node during the timeslot assigned to the node and said each of the other nodes having a receiving timeslot for receiving messages via said network during said receiving timeslot, said node and said each of the other nodes not having assigned TDMA timeslots for transmitting.

20. The method of claim 19 wherein each of the messages is transmitted using a different carrier frequency or is transmitted using a different orthogonal or nearly orthogonal transmit spreading code.

21. The method of claim 19 wherein the messages transmitted from one of the other-nodes uses a carrier frequency different from carrier frequencies used by all other of the other-nodes or uses an orthogonal or nearly-orthogonal transmit spreading code different from spreading codes used by all other of the other-nodes.

22. A method comprising:
using one of a plurality of transmit spreading codes to transmit a message from one of a plurality of ultra-wideband radios to at least one other of said ultra-wideband radios in a wireless network during a timeslot assigned to the at least one other ultra-wideband radio for receiving the message;
wherein each of said plurality of ultra-wideband radios is not assigned a timeslot for transmitting, but is assigned a timeslot for receiving messages transmitted from other radios in said plurality of ultra-wideband radios.

23. The method of claim 22 further comprising:
receiving and demodulating the message, using the one of the plurality of the transmit spreading codes at the at least one other ultra-wideband radio during the timeslot.

24. A node comprising:
at least one transmitter configured to transmit to a destination node in a network of nodes using an assigned modulation scheme during a first timeslot for receiving assigned to the destination node; and
a plurality of receivers configured to receive a plurality of messages during a second timeslot for receiving assigned to the node, said first receiving timeslot and said second receiving timeslot being the same or being mutually-exclusive timeslots;
wherein each node in said network of nodes has an assigned timeslot for receiving but not for transmitting.

25. A method for transmitting and receiving messages in a network of a plurality of nodes comprising:
for each of said plurality of nodes, assigning a timeslot for receiving said messages from, and not assigning a timeslot for transmitting said messages to, all other of said plurality of nodes; and
transmitting at least one of said messages to at least one of said nodes only during a receiving timeslot assigned to said at least one of said nodes.

26. A method comprising:
transmitting and receiving messages in a network of a plurality of nodes including transmitting at least one of said messages to at least one of said nodes only during a receiving timeslot assigned to said at least one of said nodes, wherein each of said plurality of nodes is assigned a receiving timeslot and is not assigned a transmitting timeslot.

* * * * *